(12) United States Patent
Oi et al.

(10) Patent No.: US 6,598,096 B1
(45) Date of Patent: Jul. 22, 2003

(54) DEVICE AND METHOD FOR CONTROLLING PACKET TRANSFER

(75) Inventors: Kenji Oi, Kasugai (JP); Takashi Shimizu, Kasugai (JP); Hirotaka Ueno, Kasugai (JP); Hiroshi Takase, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,750

(22) Filed: Mar. 16, 2000

(30) Foreign Application Priority Data

Apr. 27, 1999 (JP) .......................................... 11-119158

(51) Int. Cl.⁷ ................................................ G06F 3/00
(52) U.S. Cl. ............................ 710/10; 710/15; 710/18; 710/43
(58) Field of Search ......................... 710/10, 28, 30, 710/43, 60, 61, 15, 18

(56) References Cited

U.S. PATENT DOCUMENTS

| | | | | |
|---|---|---|---|---|
| 4,517,641 A | * | 5/1985 | Pinheiro | 710/20 |
| 5,335,325 A | * | 8/1994 | Frank et al. | 711/163 |
| 5,519,877 A | * | 5/1996 | Yoneda et al. | 709/400 |
| 5,946,298 A | * | 8/1999 | Okuyama | 370/232 |
| 6,081,852 A | * | 6/2000 | Baker | 710/10 |
| 6,202,103 B1 | * | 3/2001 | Vonbank et al. | 710/15 |
| 6,286,071 B1 | * | 9/2001 | Iijima | 710/124 |
| 6,334,161 B1 | * | 12/2001 | Suzuki et al. | 709/212 |

FOREIGN PATENT DOCUMENTS

JP  9-331342  12/1997

* cited by examiner

Primary Examiner—Jeffrey Gaffin
Assistant Examiner—Eron Sorrell
(74) Attorney, Agent, or Firm—Arent Fox Kintner Plotkin & Kahn, PLLC

(57) ABSTRACT

An IEEE 1394 compliant bus controller transfers data packets between connected nodes. The controller includes a processor which divides a series of data into blocks and then stores the blocks in multiple packets (one block per packet). The packets are then transferred over the bus from a source node to a destination node at equal intervals until the entire series of data has been transferred. An initialization prohibition unit prohibits initialization of the nodes during the data transfer which may be caused, for example, by hot plugging (connecting a new node to the bus) during the data transfer.

21 Claims, 5 Drawing Sheets

DEVICE AND METHOD FOR CONTROLLING PACKET TRANSFER

BACKGROUND OF THE INVENTION

The present invention relates to a device and a method for controlling packet transfer, and more particularly, to a packet transfer controller that complies with the IEEE 1394 interface standard.

The IEEE 1394 standard is used in controllers that transfer large and continuous amounts of data, such as dynamic image data, at high speeds. According to this standard, isochronous data transfer is performed every 125 µs. An irregularity in the transfer timing of the dynamic image data results in insufficient continuity of the reproduced dynamic image. This causes the reproduced dynamic image to lack reality. Thus, isochronous transfer is performed by dividing the dynamic image data into a plurality of packets and continuously transferring the packets at equal intervals. This allows the reproduced dynamic image to look real.

Hot plugging is standardized by the IEEE 1394 and refers to the connection or disconnection of one or more devices (nodes) to an IEEE 1394 bus while power is being supplied to the bus. Further, hot plugging results in topology changes.

When the topology changes, a prior art transfer controller performs initialization or bus reset to map the topology even while packets are being transferred. The initialization interrupts the transfer of packets and interferes with the reproduction of real looking dynamic images.

SUMMARY OF THE INVENTION

It is an object of the present invention to provide a device and a method for controlling packet transfer that prevents bus reset during data transfer.

To achieve the above object, the present invention provides a packet transfer device used to transfer data between a plurality of nodes. The packet transfer dexice includes a processor for storing a series of data in a plurality of packets. The series of data is divided into a plurality of blocks, each stored in one of the packets. The packets are transferred at equal intervals. An initialization prohibition unit prohibits initialization of the nodes during the transfer of the data.

Another aspect of the present invention provides a packet transfer method for transferring a series of data between a plurality of nodes. The method includes the steps of dividing the series of data, storing the divided data in a plurality of packets, sequentially transferring the packets at equal intervals, and prohibiting initialization of the nodes during the transfer of the packets.

A further aspect of the present invention provides a packet transfer controller for controlling the transfer of a series of data packets between nodes connected to each other by a bus cable. The nodes and the bus cable define a bus topology. The controller includes a socket for mating with a plug of the bus cable. When the plug mates with the socket, the bus cable is electrically connected to the controller. A processing circuit, connected to the socket, transmits packets to and receives packets from the bus cable. A host processor is connected to the processing circuit to receive packets therefrom and transmitting packets thereto. A monitor circuit monitors the transfer of the series of data packets between the nodes. While a series of packets is being transferred between the nodes, the monitoring circuit inhibits reinitialization caused by changing the bus topology.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A computer system according to a first embodiment of the present invention will now be described with reference to FIGS. 1 to 5.

Figure 1:
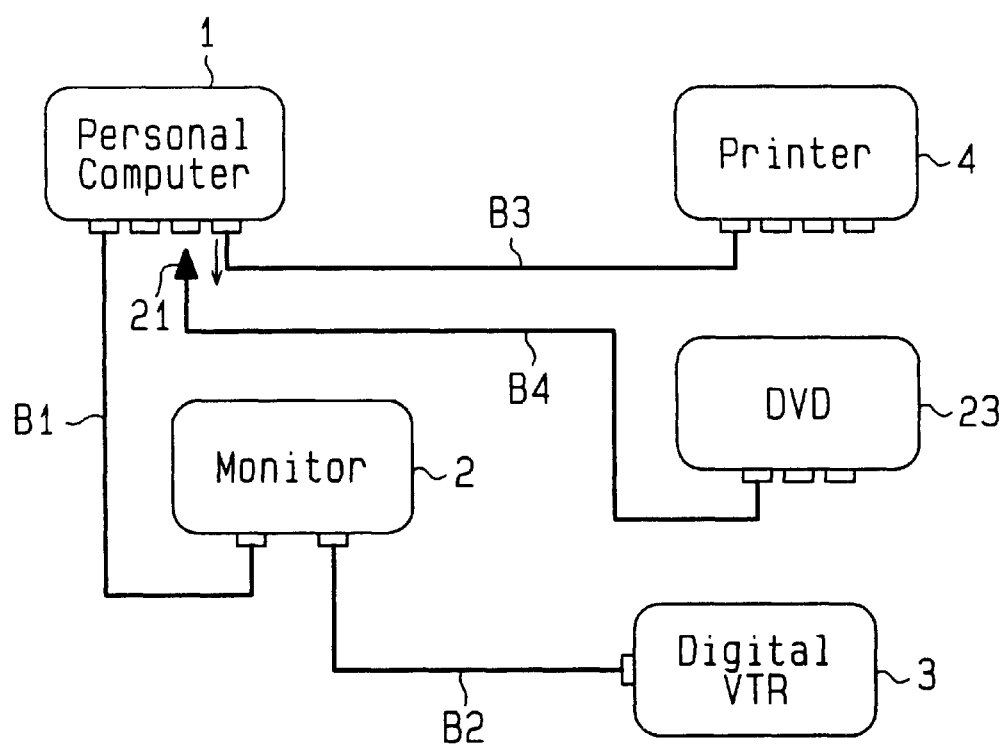
FIG. 1 is a schematic block diagram showing a computer system according to a first embodiment of the present invention.

The computer system illustrated in FIG. 1 uses IEEE 1394 compatible bus cables B1–B4. The bus cable B1 connects a monitor 2 to a personal computer 1. The bus cable B2 connects a digital VTR 3 to the monitor 2. The bus cable B3 connects a printer 4 to the computer 1. The bus cable B4 is connected to a DVD device 23, but not connected to the computer 1.

Figure 2:
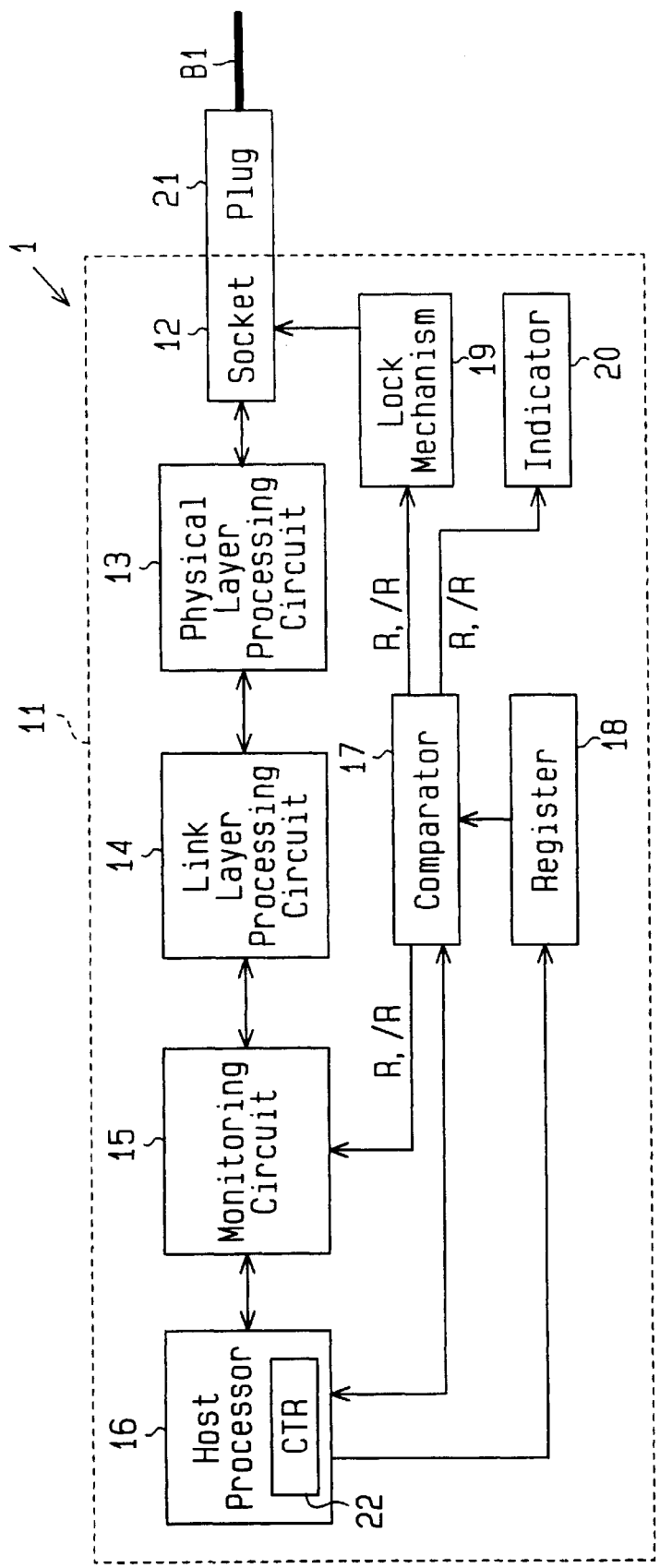
FIG. 2 is a schematic block diagram showing a packet transfer controller employed in the system of FIG. 1.

FIG. 2 is a schematic block diagram showing a packet transfer controller 11, which is incorporated in the computer 1. The monitor 2, the digital VTR 3, and the printer 4 are each also provided with the same packet transfer controller 11. The packet transfer controller 11 includes a socket 12, a physical layer processing circuit 13, a link layer processing circuit 14, a monitoring circuit 15, a host processor 16, a comparator 17, a register 18, a lock mechanism 19, and an indicator 20. The socket 12 is connected to the physical layer processing circuit 13. The physical layer processing circuit 13 is connected to the link layer processing circuit 14. The link layer processing circuit 14 is connected to the monitoring circuit 15. The monitoring circuit 15 is connected to the host processor 16. The host processor 16 is connected to the comparator 17 and the register 18. The register 18 is connected to the comparator 17. The comparator 17 is connected to the monitoring circuit 15, the lock mechanism 19, and the indicator 20.

The socket 12 is connected to a plug 21 of the bus cable B1. The computer 1 includes a number of sockets 12 which correspond to the number of ports of the node (computer 1). As shown in FIG. 1, the computer 1 is provided with four of the sockets 12.

Packets transferred from other nodes are provided to the physical layer processing circuit 13 via the socket 12. The physical layer processing circuit 13 converts the electrical signals of each packet to logic signals and provides the logic signals to the link layer processing circuit 14. The physical layer processing circuit 13 also converts logic signals from the link layer processing circuit 14 and converts them to electrical signals that are transferred to other nodes via the cable B1.

The link layer processing circuit 14 checks the format of the input packet. During the format check, the link layer processing circuit 14 determines whether the packet is addressed to its node from the contents of a header, which is included in the packet. If the packet is addressed to its node, the link layer processing circuit 14 passes the packet through the monitoring circuit 15 to the host processor 16.

To isochronously transfer a series of data, such as image data, to other nodes, the host processor 16 divides the data into a plurality of blocks. Each block is stored in a packet, which is generated by the host processor 16. The packets are provided to the link layer processing circuit 14 at equal intervals (125 μs).

The host processor 16 has a cycle timer register (CTR) 22. The CTR 22 is provided with a timer (not shown) to measure time. The host processor 16 outputs the packets at equal intervals based on the measured time. Further, the host processor 16 computes the time length required for the completion of isochronous data transfer based on the data amount. The host processor 16 then calculates the completion time of the isochronous data transfer using the time measured by the CTR 22 and stores the completion time information in the register 18.

The comparator 17 detects the completion of the isochronous data transfer, or the timing for cancelling topology lock cancellation timing, upon completion of the isochronous data transfer. The comparator 17 compares the data transfer completion time stored in the register 18 with the current time kept by the CTR 22. If the time kept by the CTR 22 has not reached the transfer completion time, the comparator 17 provides a lock signal R to the monitoring circuit 15, the lock mechanism 19, and the indicator 20. If the time kept by the CTR 22 has reached the transfer completion time, the comparator 17 provides an unlock signal/R to the monitoring circuit 15, the lock mechanism 19, and the indicator 20.

The monitoring circuit 15 monitors the signals received from the host processor 16 when activated in response to the lock signal R. The unlock signal /R deactivates the monitoring circuit 15 and prevents it from monitoring the signals from the host processor 16. More specifically, when the host processor 16 provides an initialization signal to the physical layer processing circuit 13, the monitoring circuit 15, when activated, inhibits the signal, and when deactivated, permits all of the command signals from the upstream devices to be provided to the physical layer processing circuit 13. The initialization signal is a command generated by the host processor 16 or a device upstream of the host processor 16. Upon receipt of the command, the physical layer processing circuit 13 begins initialization, or bus reset, to map the new topology created by adding a new node.

When activated by the lock signal R, the lock mechanism 19 physically prohibits connection of the plug 21 to the socket 12 and disconnection of the plug 21 from the socket 12 (hot plugging). The unlock signal /R deactivates the lock mechanism 19 so that connection of the plug 21 to the socket 12 and disconnection of the plug 21 from the socket 12 (hot plugging) is permitted.

The indicator 20 includes an LED lamp arranged near the socket 12. The indicator 20 is lit in response to the lock signal R to indicate that data is being transferred and turned off in response to the unlock signal /R to indicate that data is not being transferred.

The comparator 17, the monitoring circuit 15, the lock mechanism 19, the indicator 20, and the CTR 22 form an initialization prohibition unit.

The transfer process performed by each mode will now be discussed with reference to the flowcharts illustrated in FIGS. 3 to 5.

Figure 3:
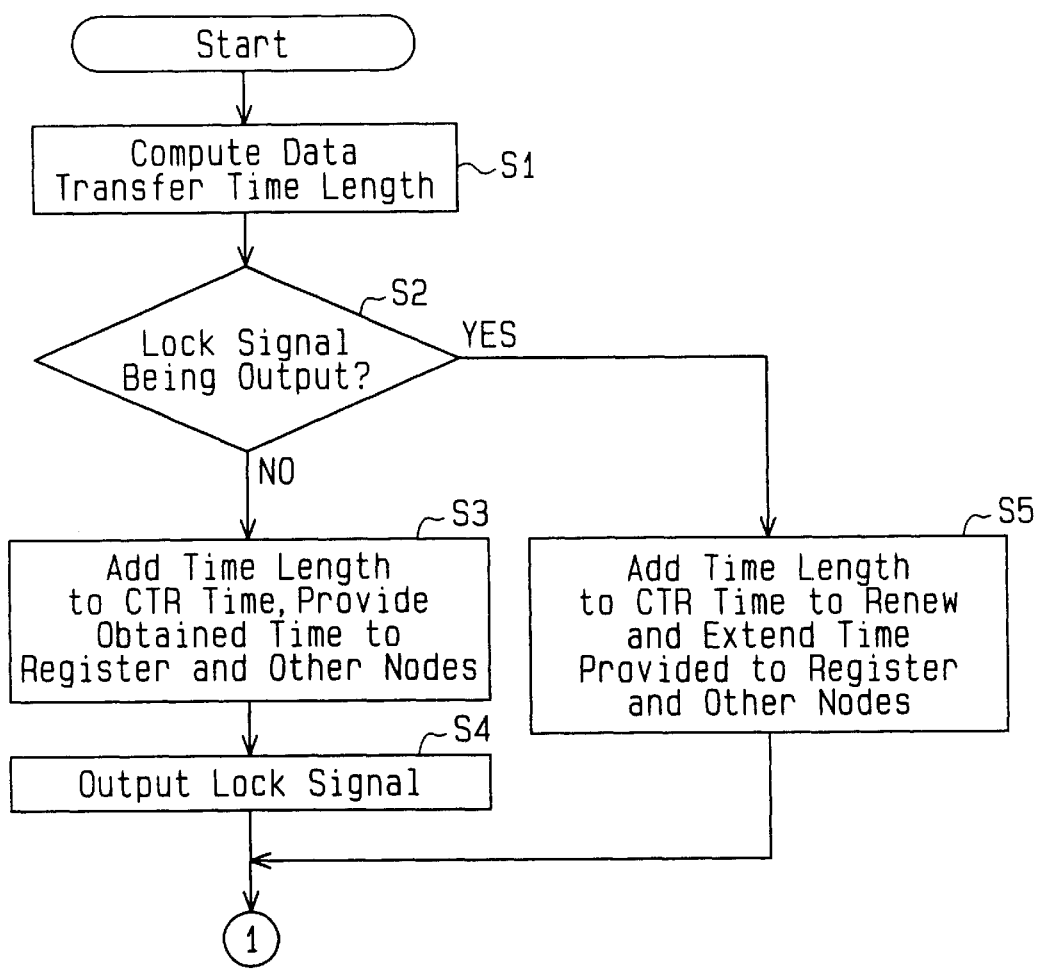
FIGS. 3 to 5 are flowcharts showing a transfer process performed in the first embodiment.
Figure 4:
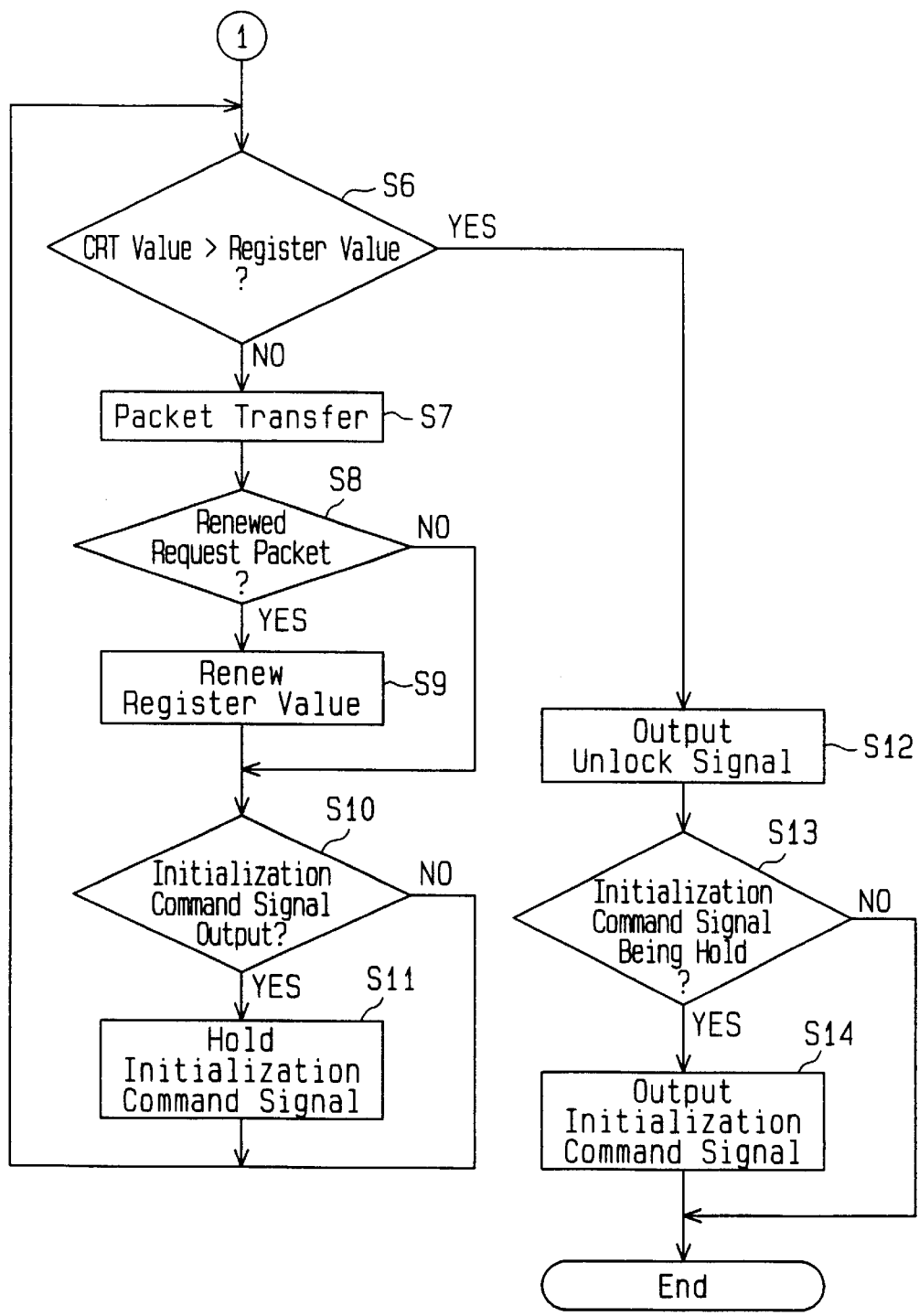

The packet transfer controller 11, where the isochronous packet originates, performs steps S1–S14, which are illustrated in FIGS. 3 and 4.

At step S1, the host processor 16 computes the length of time required to complete the transfer of the data packets.

At step S2, the host processor 16 determines whether the lock signal R is being output by the comparator 17. If the lock signal R is not being output, the host processor 16 proceeds to step S3.

At step S3, the host processor 16 adds the time length obtained in step S1 to the time measured by the CTR 22 and provides the sum to the register 18. The sum is also contained in packets provided to the link layer processing circuit 14 by the host processor 16. Thus, the completion time of the data transfer is stored in the register 18 of the packet transfer controller 11 and in the registers 18 of packet transfer controllers 11 incorporated in other nodes. Further, the data transfer completion time is stored in a start request packet of a cycle start packet (CS packet). The start request packet stores information used to transmit the CS packet to a root node. The root node that receives the information transmits the CS packet to each node at equal intervals (125 μs).

At step S4, the comparator 17 provides the lock signal R to the monitoring circuit 15, the lock mechanism 19, and the indicator 20 when the time value of the CTR 22 is smaller that stored in the register 18. This activates the monitoring circuit 15. In this state, the monitoring circuit 15 monitors the signals sent to the link layer processing circuit 14 from the host processor 16. The indicator 20 is lit in response to the lock signal R to indicate that data is being isochronously transferred. The lock signal R also activates the lock mechanism 19. This prohibits changes in the connection state of the socket 12 and the plug 21. Thus, the topology is maintained and bus reset is prohibited.

In step S2, if the lock signal R is active, that is, if data is already being isochronously transferred between nodes, the host processor 16 proceeds to step S5. At step S5, the host processor 16 recalculates the time value of the register 18 since the value obtained in step S1 is greater than the time value of the register 18 indicating that the isochronous transfer time still has to be extended. More specifically, the host processor 16 adds the time length obtained in step S1 to the time of the CTR 22 and updates the transfer completion time stored in the register 18 with the obtained value. The host processor 16 provides the updated value in a renewed request packet to the link layer processing circuit 14.

Upon completion of step S4 or S5, the host processor 16 proceeds to step S6. At step S6, the comparator 17 determines whether the time value stored in the register 18 is greater than the time value of the CTR 22. If the time value of the CTR 22 is equal to or less than the time value of the register 18, the host processor 16 proceeds to step S7.

At step S7, the packet transfer controller 11 performs a packet transfer process. More specifically, the host processor 16 transmits packets to the link layer processing circuit 14 in response to the CS packet and receives packets from other nodes. After the packet transfer process is completed, the host processor 16 proceeds to step S8.

At step S8, the host processor 16 determines whether a received packet is a renewed request packet. If the packet is a renewed request packet, the host processor 16 proceeds to step S9.

At step S9, the host processor 16 adds the time value of the renewed request packet to the time value of the CTR 22 to update the transfer completion time stored in the register 18.

At step S10, the monitoring circuit 15 determines whether the host processor 16 is providing an initialization command signal to the physical layer processing circuit 13. If the initialization command signal is being provided, the host processor 16 proceeds to step S11. At step S11, the monitoring circuit 15 inhibits the initialization command signal. The host processor 16 then returns to step S6. If the initialization command signal is not being provided in step S10, the host processor 16 returns to step S6. This prevents bus reset.

If the comparator 17 determines that the time value stored in the register 18 is greater than that of the CTR 22 in step S6, the host processor 16 proceeds to step S12.

At step S12, the comparator 17 outputs the unlock signal /R. In response to the unlock signal /R, the indicator 20 is turned off and the lock mechanism 19 is deactivated. This permits changes in the connection state of the plug 21 and the socket 12.

At step S13, the deactivated monitoring circuit 15 determines whether the initialization command signal has been inhibited in step S11. If the initialization command signal is being held, the host processor 16 proceeds to step S14. At step S14, the monitoring circuit 15 provides the initialization command signal to the link layer processing circuit 14. This starts the initialization process, after the completion of isochronous transfer.

The operation of the node receiving an isochronous packet will now be discussed.

Figure 5:
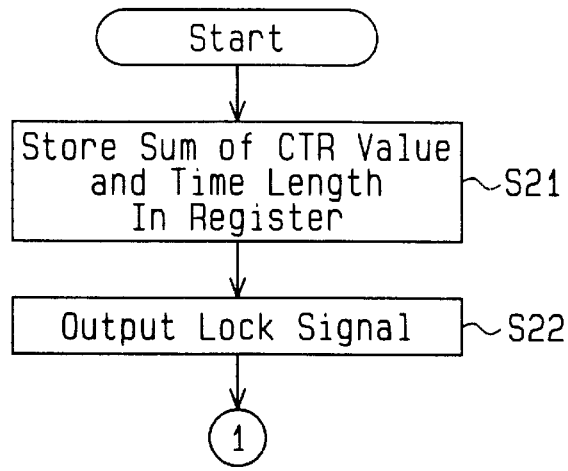

When the host processor 16 receives packets of image data or the like at equal intervals, the host processor 16, the comparator 17, and the monitoring circuit 15 perform steps S21, S22, and S6–S14, which are illustrated in FIGS. 4 and 5.

At step S21, the host processor 16 refers to the start request packet of the CS packet and adds the time length required to complete the transfer of data to the time of the CTR 22 and provides the sum to the register 18. Thus, the register 18 of the node that receives packets stores the completion time of the data packet transfer.

At step S22, the comparator 17 provides the lock signal R to the monitoring circuit 15, the lock mechanism 19, and the indicator 20 (since the time value of the CTR 22 is smaller than that of the register 18).

In response to the lock signal R, the lock mechanism 19 physically prohibits hot plugging of the plug 21 relative to the socket 12. This prevents bus reset, which is caused by hot plugging.

The indicator 20 is lit in response to the lock signal R to indicate that data is being transferred isochronously.

The host processor 16 then proceeds to step S6 and performs steps S6–S14.

An example of the operation of the packet transfer controller 11 will now be described.

In the following example, the digital VTR 3 isochronously transfers a series of data (image data) to the computer 1.

The host processor 16 of the packet transfer controller 11 incorporated in the digital VTR 3 receives a command signal, which enables data transfer to the computer 1, from an upstream circuit. Then, the host processor 16 divides the series of data into a plurality of blocks and stores each block in a packet.

At step S1, the host processor 16 computes the time required to transfer all of the packets.

At this time, the transfer of packets is not being performed between the nodes 1–4. Thus, at step S2, the host processor 16 determines that the lock signal R is not being output.

At step S3, the host processor 16 adds the time length to the time of the CTR 22 and stores the sum in the register 18.

The obtained data transfer completion time is stored in the start request packet of a CS packet and transmitted to the nodes 1, 2, 4.

At step S4, the time value of the CTR 22 is smaller than the time value of the register 18. Thus, the comparator 17 provides the lock signal R to the monitoring circuit 15, the lock mechanism 19, and the indicator 20. This activates the monitoring circuit 15 and lights the indicator 20. The lock mechanism 19 prohibits the connection state of the socket 12 and the plug 21 of the bus cables B1–B3 from being changed. In this state, referring to FIG. 1, the bus cable B4 extending from the DVD device 23 cannot be connected to the socket 12 of the computer 1. Further, the plug 21 of the bus cable B3, which connects the printer 4 and the computer 1, cannot be disconnected from the socket 12 of the computer 1. Thus, the bus topology is maintained.

At step S7, in response to the CS packet, one of the data packets is transmitted to the link layer processing circuit 14 from the host processor 16. The transmitted packet passes through the link layer processing circuit 14 and the physical layer processing circuit 13 and is output from the packet transfer controller 11 of the digital VTR 3. The packet is then transmitted to the packet transfer controller 11 of the computer 1 via the bus cables B2, B1.

Steps S6 to S11 are repeated until the comparator 17 determines that the time value of the CTR 22 is greater than that of the register 18 in step S6. In other words, step S7 is repeated until the transmission of all of the packets, in which the divided series of data are stored, is completed.

When a renewed request packet is received from the other nodes 1, 3, 4 while step S7 is being repeated, the time value of the register 18 is updated to a value obtained by adding the time value of the CTR 22 to the time value of the renewed request packet (step S9). If an initialization command signal is received by the monitoring circuit 15 when step S7 is being repeated, the monitoring circuit 15 inhibits the command signal (step S11).

The time value of the CTR 22 becomes greater than that of the register 18 upon completion of the data transfer. In such state, at step S12, the comparator 17 provides the unlock signal /R to the monitoring circuit 15, the lock mechanism 19, and the indicator 20. This deactivates the lock mechanism 19 and turns off the indicator 20. Thus, the lock mechanism 19 permits the connection state of the socket 12 and the plug 21 to be changed. This allows changes in the bus topology.

When the initialization command signal is inhibited, the monitoring circuit 15 now provides the command signal to the link layer processing circuit 14 (step S14). The link layer processing circuit 14 then provides the initialization command signal to the physical layer processing circuit 13 to perform initialization after completion of the isochronous transfer.

In the following example, the monitor 2 isochronously transfers a series of data (image data) to the computer 1 when packet transfer is being performed between the computer 1 and the printer 4.

In this case, since data is being isochronously transferred, the comparator 17 of the printer 4 is already outputting the lock signal R. Thus, the monitoring circuit 15 is activated and the indicator 20 is lit. Further, the lock mechanism 19 prevents the bus topology from being changed.

At step S1, the host processor 16 of the digital VTR 3 computes the time required to transfer the series of data. At step S2, the host processor 16 determines whether the lock signal R is being output. At step S5, if the value of the data transfer completion time is greater than the time value of the register 18 (i.e., when the isochronous time is extended), the host processor 16 updates the value of the register 18. The updated data transfer completion time is stored in a renewed request packet and transmitted to each of the nodes 1, 2, 4.

At step S7, one of the packets is transmitted to the link layer processing circuit 14 from the host processor 16 of the digital VTR 3 in response to the CS packet. The transmitted packet is transmitted from the link layer processing circuit 14 to the physical layer processing circuit 13 and is then transferred to the packet transfer controller 11 of the computer 1 via the bus cables B2, B1. Afterward, data is isochronously transferred between each of the nodes 1–4.

The advantages of the packet transfer controller 11 will now be discussed.

(1) The lock mechanism 19 maintains the bus topology when packets are being sequentially transferred at equal intervals. This prevents, for example, inadvertent disconnection of the bus cable B1 during the transfer of data from the digital VTR 3 to the computer 1. Thus, initialization resulting from a bus topology change does not take place and data transfer is not interrupted. Accordingly, the continuity of data transfer (the packet transfer being performed at equal intervals) is guaranteed.

(2) When data is being transferred at equal intervals, the monitoring circuit 15 inhibits the initialization command signal from the host processor 16. Thus, initialization of the physical layer processing circuit 13 is not performed and data transfer is not interrupted. Accordingly, the continuity of data is guaranteed.

(3) When data is being transferred at equal intervals, the indicator 20 is lit to indicate that data is being transferred. This allows a user to easily confirm when to change the bus topology.

(4) The register 18 stores the value obtained by adding the value of the current time in the CTR 22 to the value of the computed data transfer completion time. Thus, topology change and initialization are prohibited until the time value of the CTR 22 becomes greater than the data transfer completion time. The period during which initialization is prohibited is timed with the CTR 22. Thus, the lock signal R and the unlock signal /R are synchronized at all of the nodes 1–4.

(5) The packet transfer controller 11, from where the packets originate, notifies the other nodes 1, 2, 4 of the computed data transfer completion time. Each of the nodes 1, 2, 4 prohibits topology changes and initialization until the data transfer completion time. This prohibits initialization of the entire system and guarantees continuous transfer of data.

It should be apparent to those skilled in the art that the present invention may be embodied in many other specific forms without departing from the spirit or scope of the invention. Particularly, it should be understood that the present invention may be embodied in the following forms.

Instead of notifying the other nodes 1, 2, 4 of the packet transfer completion time, the transfer time of the first packet and the transfer time of the last packet may be provided to the other nodes 1, 2, 4. Initialization is also prohibited when packets are being transferred.

Figure 6:
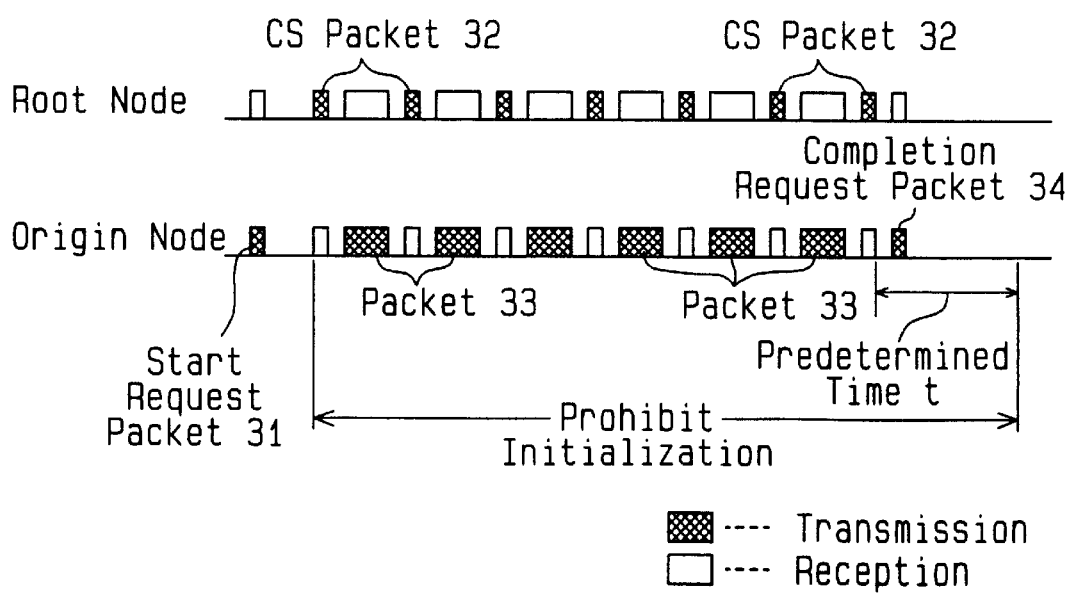
FIG. 6 is a timing chart showing a transfer process performed in a second embodiment of the present invention.

Initialization may be prohibited when the CS packet is being transferred, and the initialization may be performed when the CS packet has not transferred for more than a predetermined time. For example, referring to FIG. 6, a start request packet 31 of a CS packet is transmitted from an origin node, or a node where the data to be transferred originates. When a root node receives the packet 31, the root node transmits the CS packet 33 at equal intervals. The origin node transmits a completion request packet 34 of the CS packet in response to the next CS packet 32 after the transfer of the final packet 33 is completed. When the root node receives the packet 34, the transmission of the CS packet 32 is stopped. If the transfer of the CS packet 32 is stopped for a predetermined time t, the initialization of each of the nodes is permitted. This embodiment also has the advantages (1) to (3) of the first embodiment. Further, all of the nodes acknowledge the completion of data transfer without using special packets.

In the first embodiment, one or more of the following operations are performed when data is being transferred, (a) maintaining the bus topology, (b) inhibiting the initialization command signal from the host processor 16, and (c) turning the LED lamp on.

In the first embodiment, the lock mechanism 19 may be eliminated and replaced by a known connector having hooks to prevent the disconnection of the plug. In this case, if the plug 21 is connected to the socket 12 during the isochronous transfer of data, initialization is prevented if the connector is not electrically connected to the physical layer processing circuit 13.

In the first embodiment, the indicator 20 may be arranged at other locations and devices other than the LED may be used as the indicator. For example, part of the monitor 2 may be used to indicate that data is being transferred.

In the first embodiment, the CTR 22 may be provided in the link layer processing circuit 14.

In the first embodiment, the time length may be stored in a packet other than the start request packet of the CS packet and provided to the other nodes.

In the first embodiment, the monitoring circuit 15 may be arranged between the link layer processing circuit 14 and the physical layer processing circuit 13.

The present examples and embodiments are to be considered as illustrative and not restrictive, and the invention is not to be limited to the details given herein, but may be modified within the scope and equivalence of the appended claims.

What is claimed is:

1. A packet transfer device used to transfer data between a plurality of nodes comprising:
    a data processing unit for transmitting and receiving data in a plurality of packets which are transferred at equal intervals; and
    an initialization prohibition unit for prohibiting initialization of the nodes during the transfer of the data, the initialization prohibition unit includes:
        a register for storing a data transfer completion time;
        a cycle time register for storing a current time; and
        a comparator, connected to the register and the cycle time register, for comparing the current time with the data transfer completion time and generating a lock signal for inhibiting the initialization in accordance with the comparison signal.

2. The device according to claim 1, wherein a bus cable is connected to the packet transfer device, and wherein the initialization prohibition unit includes a lock mechanism for prohibiting the disconnection of the bus cable during the transfer of data.

3. The device according to claim 1, wherein the initialization prohibition unit includes an indicator that indicates when data is being transferred.

4. The device according to claim 1, wherein the data processing unit generates a logic data signal and an initialization command signal, the packet transfer device further comprising a physical layer processing circuit for receiving the logic data signal and the initialization command signal, and a monitoring circuit that monitors the initialization command signal transmitted to the physical layer processing circuit from the data processing unit.

5. The device according to claim 4, wherein the monitoring circuit inhibits the transmission of the initialization command signal to the physical layer processing circuit while data is being transferred.

6. The device according to claim 5, wherein the monitoring circuit transmits the inhibited command signal after completion of the transfer of the series of data.

7. The device according to claim 5, wherein the data processing unit computes the length of time required to transfer the series of data and notifies each of the nodes of said time length, and wherein the initialization prohibition unit inhibits the initialization command signal for the computed time length.

8. The device according to claim 7, wherein the data processing unit uses the computed time length to compute the time at which the transfer of data is completed.

9. The device according to claim 7, wherein the transfer of data is performed isochronously and includes the transfer of a cycle start packet, wherein the initialization prohibition unit prohibits the initialization in accordance with the cycle start packet and permits the initialization a predetermined time after the cycle start packet has been transferred.

10. The device according to claim 1, wherein the data processing unit includes a physical layer processing unit for converting from the electrical signals of the packet to logical signals and a link layer processing circuit for checking the format of the packet.

11. A packet transfer method for transferring data between a plurality of nodes, the method comprising the steps of:

receiving data in a plurality of packets which are transferred at equal intervals;

estimating a data transfer completion time;

comparing a current time with the data transfer completion time; and generating a lock signal for inhibiting the initialization in accordance with the comparison signal.

12. The method according to claim 11, further comprising the steps of:

computing the time length required to transfer all of the packets;

notifying each of the nodes of the computed time length; and prohibiting the initialization of the nodes for the computed time length.

13. The method according to claim 12, further comprising the step of inhibiting an initialization command generated by one of the nodes during the computed time length.

14. The method according to claim 13, further comprising the step of permitting the initialization subsequent to the packet transfer step.

15. A packet transfer controller for controlling the transfer of packets between nodes connected to each other by a bus cable, wherein the nodes and the bus cable define a bus topology, the controller comprising:

a socket for mating with a plug of the bus cable, wherein when the plug mates with the socket, the bus cable is electrically connected to the controller;

a processing circuit, connected to the socket, for transmitting packets to and receiving packets from the bus cable; and a monitor circuit for monitoring the transfer of packets between the nodes by comparing a current time with a data transfer completion time, wherein while packets are being transferred between the nodes, the monitoring circuit inhibits reinitialization caused by changing the bus topology.

16. The packet transfer controller of claim 15, wherein the monitor circuit generates a lock signal when packets are being transferred between the nodes, the controller further comprising:

a lock mechanism connected to the socket and the monitor circuit and receiving the lock signal from the monitor circuit, wherein when the lock signal is active, the lock mechanism prevents the plug from being disconnected from the socket.

17. The packet transfer controller of claim 15, wherein the monitor circuit generates a lock signal when packets are being transferred between the nodes, the controller further comprising:

an indicator connected to the monitor circuit and receiving the lock signal from the monitor circuit, wherein when the lock signal is active, the indicator is activated, thereby notifying a user that packets are being transferred and that the plug should not be disconnected from the socket.

18. The packet transfer controller of claim 17, wherein the indicator comprises an LED.

19. The packet transfer controller of claim 17, further comprising:

a lock mechanism connected to the socket and the monitor circuit and receiving the lock signal from the monitor circuit, wherein when the lock signal is active, the lock mechanism prevents the plug from being disconnected from the socket.

20. A packet transfer controller for controlling the transfer of packets between nodes connected to each other by a bus cable, the controller comprising:

a socket for mating with one of a plurality of plugs of the bus cables, wherein when the plug mates with the socket, the bus cable is electrically connected to the controller;

a processing circuit, connected to the socket, for transmitting packets to and receiving packets from the bus cable;

a monitor circuit for monitoring the transfer of packets between the nodes; and a lock mechanism, connected to the socket and monitor circuit, for prohibiting connection of the plug to the socket and disconnection of the plug from the socket physically.

21. The packet transfer controller according to claim 20, wherein the monitor circuit monitors the transfer of packets in accordance with a lock signal generated by comparing a current time with a data transfer completion time.

* * * * *